UNITED STATES PATENT OFFICE.

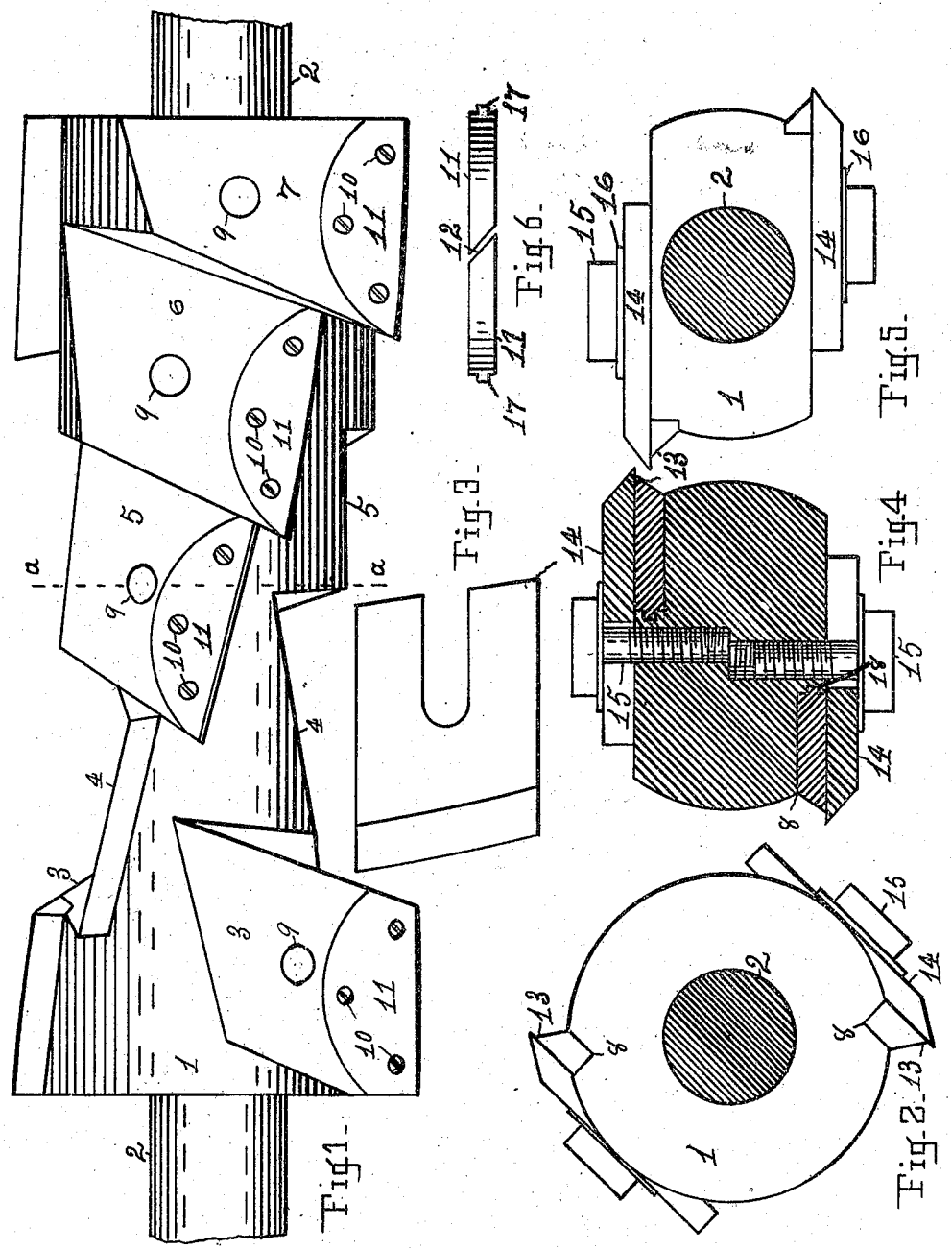

CHARLES JOHNSON, OF NEW LONDON, WISCONSIN.

CUTTER-HEAD.

No. 894,889.      Specification of Letters Patent.     Patented Aug. 4, 1908.

Application filed April 27, 1908. Serial No. 429,560.

*To all whom it may concern:*

Be it known that I, CHARLES JOHNSON, a citizen of the United States, residing at New London, in the county of Outagamie and State of Wisconsin, have invented a new and useful Cutter-Head, of which the following is a specification.

My invention relates to an improvement in the construction of a cutter head for which an application was filed by me February 13, 1908, Serial No. 415,713, for Letters Patent of the United States, and it consists of the form of the bar of metal from which the cutter head is made, and also, in the manner of applying chip breakers to the cutter head and to the method by which the chip breakers can be made, said chip breakers being made separable from the cutter head and secured thereto with screws, and thereby effecting a great saving in the weight of material and of labor in forming both the shaft and chip breakers, the improvement being shown in the accompanying drawing, in which,—

Figure 1 is a side elevation of a cutter head made according to my improvement. Fig. 2 is an end view of the left hand end of Fig. 1. Fig. 3 is a plan of a knife used in the cutter head. Fig. 4 is a transverse section of the cutter head upon the line $a, a$, of Fig. 1. Fig. 5 is an end view of the right hand end of Fig. 1. Fig. 6 is an edge view of a circular disk from which the chip breakers can be formed.

Similar numerals indicate like parts in the several views.

1, indicates the cutter head shaft turned up for the head and for the bearings 2. After being turned up it is to be secured in a suitable holder, and knife seats 3, 4, 5, 6 and 7, formed in pairs upon opposite sides of the shaft, they being arranged in a diagonal direction across the shaft and helically around it with a short space circumferentially of the cutter head, between the cutting points of adjoining knives, whereby, the time during which the knives are engaged in cutting during one revolution is divided into as many parts as there are knives, the number of knives being governed by the use to which the cutter head is to be put. After forming the knife seats, the shaft is subjected to the action of a cutting tool for forming chip breaker seats 8, which seats are cut at one of the edges of the knife seats and are in the form of a segment of a circle, they being a little less than a half circle, and of a depth which is desired for the thickness of the chip breakers. While the cutter head is within the afore-mentioned holder for the formation of knife and chip breaker seats, its bolt hole 9 for receiving a knife securing bolt may be bored, and also, holes for receiving fastening screws 10, for holding the chip breaker to its seat.

The chip breakers 11 consist of circular segments, and may be formed by first making a circular disk of the proper diameter as is shown in Fig. 6, and making a cut 12, diagonally across it and thereby making two chip breakers from one disk. Each one is to be drilled and countersunk for receiving flat headed screws, and the chip breakers can be prepared according to a standard pattern in quantities any time previous to their use.

The chip breaking edge 13, of the chip breakers is to be arranged relative to the knife seats and be upon such a curve as will correspond with the curve which the knife cutting edges are required to have in order to cut a plain even surface upon the article being planed. It will be observed that some of the corners of a part of the chip breakers require to be cut off for fitting some of the knife seats, especially, those at the ends of the cutter head. The chip breakers are to be formed of a suitable metal, preferably of tool steel, and after being fitted to their respective seats, drilled, countersunk and their chip breaking edges finished to the proper form and curve, they may be tempered and thereby add largely to the wearing quality of them. When the chip breakers are in position around the shaft in their several knife seats, their chip breaking edges will lie at equal distances from the axial line of the cutter head and in helical lines around the cutter head spaced apart at nearly equal distances between adjoining knife seats.

The several knife seats being completed, knives 14 may be secured thereto by means of tap bolts 15, having a washer 16, between bolt heads and knife.

For assisting in holding the chip breakers in their seats and lessening the number of screws for securing them therein, the circular disks from which the chip breakers are formed, may be provided with a tongue 17, for entering a groove 18, in the curved edge of the chip breaker seat, said tongue being shown on the edge of the disk in Fig. 6 and the tongue and groove in Fig. 4, but they are not shown in Figs. 1, 2 and 5. The chip breakers being a half circle, nearly, a single screw will usually be sufficient for holding the chip breaker to its seat.

Having described my invention, what I claim and desire to secure by Letters Patent, is,—

1. A cutter head formed of a cylindrical shaft, a seat for a knife formed transversely of the shaft, a chip breaker seat of a circular segmental form at one of the outer edges of the knife seat, a chip breaker fitted to said last named seat and one or more screws for securing the chip breaker to its seat.

2. A chip breaker for a cutter head, consisting of a semi-circular plate having parallel sides, the straight edge of the semi-circle being beveled at an angle of approximately 45 degrees for forming its chip breaking edge, the superficial area of one side of the plate exceeding, and that of the other side being less, than the half of the circle of the plate from which the chip breaker is formed.

3. In a cutter head having a knife seat arranged in a diagonal direction across the cutter head shaft, a chip breaker seat of a circular segmental form at one of the outer edges of the knife seat, a groove formed in the circular edge of the chip breaker seat, a chip breaker arranged to fit within said seat, a tongue upon the circular outer edge of the chip breaker adapted to fit within said groove, with the chip breaking edge of the chip breaker projecting beyond the outer surface of said shaft, and one or more screws for securing the chip breaker to its seat.

4. A cutter head formed of a cylindrical shaft, a seat for a knife formed transversely of the shaft, a chip breaker seat of a circular segmental form at one of the outer edges of the knife seat, a chip breaker fitted to the chip breaker seat, one or more screws for securing the chip breaker to its seat, and said chip breaker upon its outer surface extending outside of the cylindrical surface of said shaft.

5. A cutter head formed of a cylindrical shaft, a seat for a knife arranged in a diagonal direction transversely of the shaft, a chip breaker seat of a circular segmental form at one of the outer edges of the knife seat, a chip breaker fitted to said chip breaker seat with its chip breaking edge projecting beyond the cylindrical surface of said shaft, and one or more screws for securing the chip breaker to its seat.

6. A cutter head formed of a cylindrical shaft, a plurality of knife seats arranged in a diagonal direction around the shaft, a chip breaker seat of a circular segmental form at one of the outer edges of each knife seat, a chip breaker fitted to each chip breaker seat with its chip breaking edge projecting beyond the cylindrical surface of said shaft and lying in a helical line different circumferentially of the shaft from the helical lines of the chip breaking edges of the chip breakers of adjoining knife seats, the chip breaking edge of each chip breaker being of such a curve as will engage with a flat even surface as the cutter head is revolved, and one or more screws for securing each chip breaker to its seat.

7. A cutter head formed of a cylindrical shaft, a plurality of knife seats arranged upon opposite sides of the shaft in pairs, each knife seat having a plain even surface adapted for having a cutting knife secured thereto, a chip breaker seat of a circular segmental form at one of the outer edges of each knife seat, a chip breaker of a like circular segmental form fitted to and secured within each chip breaker seat, the chip breaking edge of each pair of chip breakers extending outside of the cylindrical surface of said shaft and being arranged in helical lines around the axial line of the cutter head different circumferentially of the cutter head from the helical lines of the chip breaking edges of an adjoining pair of chip breakers, and one or more screws in each chip breaker for securing it to its seat.

CHARLES JOHNSON.

Witnesses:
 HANS P. MADSON,
 JNO. RUNNEL.